July 15, 1941.   H. W. BODE   2,249,415
WAVE FILTER
Filed March 9, 1939   6 Sheets-Sheet 1

INVENTOR
H. W. BODE
BY
Ralph T. Holcomb
ATTORNEY

July 15, 1941.                H. W. BODE                2,249,415
                              WAVE FILTER
                          Filed March 9, 1939           6 Sheets-Sheet 2
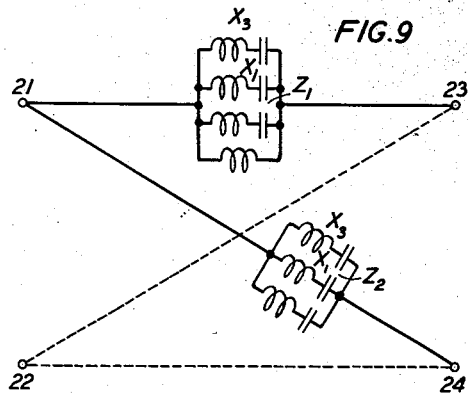
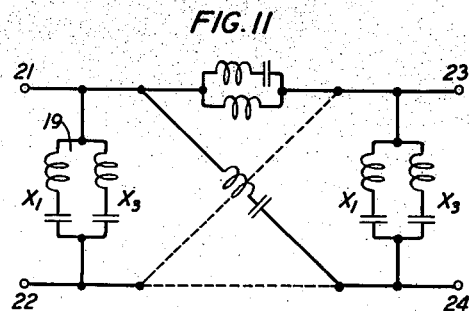
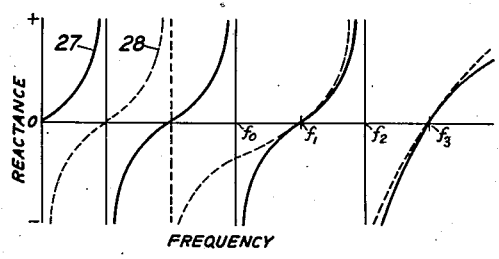
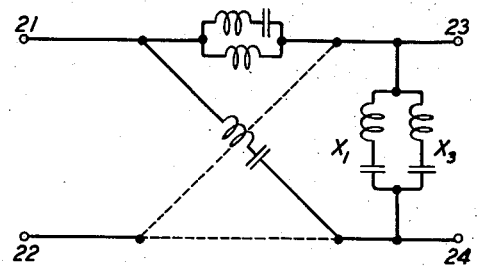
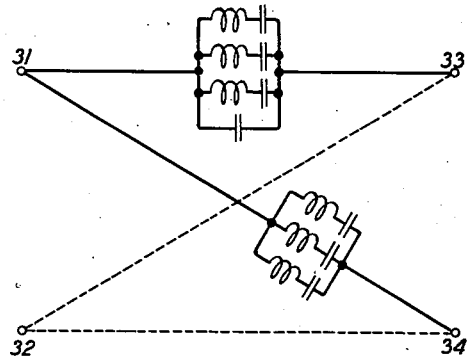
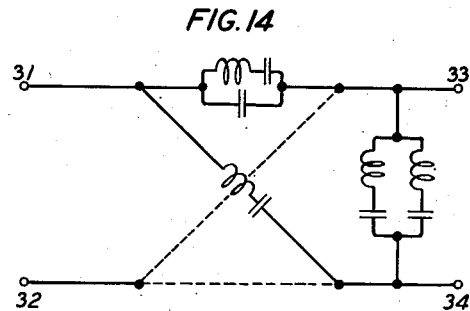
INVENTOR
H. W. BODE
BY
Ralph T. Holcomb
ATTORNEY July 15, 1941.    H. W. BODE    2,249,415
WAVE FILTER
Filed March 9, 1939    6 Sheets-Sheet 3

INVENTOR
H. W. BODE
BY
Ralph T. Holcomb
ATTORNEY

July 15, 1941. H. W. BODE 2,249,415
WAVE FILTER
Filed March 9, 1939 6 Sheets-Sheet 4

INVENTOR
H. W. BODE
BY
Ralph T. Holcomb
ATTORNEY

July 15, 1941.  H. W. BODE  2,249,415
WAVE FILTER
Filed March 9, 1939  6 Sheets-Sheet 5

INVENTOR
H. W. BODE
BY
Ralph P. Holcomb
ATTORNEY

July 15, 1941.    H. W. BODE    2,249,415
WAVE FILTER
Filed March 9, 1939    6 Sheets-Sheet 6

INVENTOR
*H. W. BODE*
BY
*Ralph T. Holcomb*
ATTORNEY

Patented July 15, 1941

2,249,415

UNITED STATES PATENT OFFICE 2,249,415

WAVE FILTER

Hendrik W. Bode, New York, N. Y., assignor to Bell Telephone Laboratories, Incorporated, New York, N. Y., a corporation of New York Application March 9, 1939, Serial No. 260,682

19 Claims. (Cl. 178—44)

This invention relates to wave filters and more particularly filter groups for interconnecting a plurality of circuits carrying currents of different frequencies with a common transmission line. Typical of such filter groups are the channel filters at the terminals of a multiplex carrier telephone system and the pairs of complementary filters used at the repeater points in carrier systems for the separation of oppositely directed channels.

The objects of the invention are to improve the driving-point impedance characteristics at the common terminals of filter groups; to permit the more effective use of the whole transmission band of each filter; to diminish the effects of wave reflection in the transmission band of each filter; and to reduce to a minimum the effect of the impedance of each filter upon the transmission characteristics of the others.

The general nature of the invention may be explained most readily by a consideration of the problems presented by the design and construction of a simple group comprising a low-pass and a high-pass filter with complementary transmission bands. Since such complementary filters are usually designed to operate with their input circuits connected in parallel to the terminals of the common line or wave source, it will suffice, for the present, to consider only this connection.

To permit the most effective use of the transmission band of each filter, it is desirable that the wave reflections at the junction points with the common line and the terminal loads should be substantially eliminated at all frequencies in the transmission band. As the terminal impedances are usually constant and purely resistive, this may be achieved by so designing the filter that its image impedances are substantially constant throughout the transmission band and equal to the resistances of the connected circuits. Methods of controlling the image impedance characteristics are described in my earlier United States Patent 1,828,454, issued October 20, 1931, and in United States Patent 1,989,545, issued January 29, 1935, to W. Cauer, wherein it is shown that constancy of the image impedances in the transmission band may be approached as closely as may be desired.

However, when the filters are connected in parallel at their common terminals, it is necessary that the impedance of each at this point should be very high at all frequencies in its attenuating range in order that its shunting effect on the other filter may be negligibly small. This requirement has heretofore greatly limited the degree to which improvement of the individual filter impedances could be carried out for the reason that the achievement of uniformity of the impedance in the transmission band is accompanied by the introduction of a multiplicity of zeros and poles of the impedance in the attenuation range. Since the attenuation range of one filter of a complementary pair coincides with the transmission range of the other, it is easy to see that the presence of zeros and poles in the impedance of either will result in serious impairment of the transmission characteristic of the other.

In accordance with one aspect of the invention a symmetrical wave filter is provided, the image impedances of which may be made as uniform as may be desired in the transmission band and the configuration of which may be made such that all of the zeros and poles of the image impedances in the attenuation range are accounted for by the resonances and anti-resonances of single complex reactances at the filter terminals. The filter configurations may also be made such that these complex resonant reactances appear either as terminating shunt branches or as terminating series branches.

The filter has the property that when connected to a matching load impedance at its output end, the removal of the resonant terminating branch at the input end eliminates all of the zeros and poles from the driving-point impedance. If the resonant reactance appears as a shunt branch, the real part, or the conductance, of the input admittance is not affected by its removal and the residual susceptance is small and of such character as to permit its substantial neutralization. If the resonant reactance appears as a series branch, its removal does not affect the resistance component of the driving-point impedance.

The filter may have a series-shunt or ladder configuration and in a modified form may have different image impedances at its two ends. In the latter case a preferred form has a constant-k image impedance at one end so that it may be built out to provide any desired degree of attenuation by means of standard filter sections.

In another aspect the invention provides wave filters characterized by input impedances or admittances which have real parts, resistances or conductances, that are uniform to a high degree throughout the transmission bands and which have imaginary parts, reactances or susceptances, of certain unique minimum values determined by the frequency characteristics of the corresponding real parts. The explanation of these minimum reactances and susceptances is given at length hereinafter. These filters are obtained from the prototype filters described above by the omission of the resonant reactance branches at the input ends. Their minimum reactance or minimum susceptance characteristics make them well adapted for group operation since, as will be shown later, the reactances or susceptances of the different filters tend to compensate each other when the filters are connected to a common input circuit. A further aspect of the invention is, therefore, the combination of the improved filters in complementary pairs or in groups for the separation of different frequency ranges.

A feature of the symmetrical prototype filters of the invention is that its transfer constant has an infinite value at each pole and each zero of its image impedance. By virtue of this feature it becomes possible to segregate into the terminating branches all of the elements that produce the poles and zeros of the image impedance nd, hence, to provide, by the omission of one or other of these branches, filters with uniform resistance or conductance and with minimum reactance or susceptance. By virtue of this feature also the realization of the filter in a symmetrical series-shunt or ladder configuration is made always possible. Furthermore, each half of the symmetrical ladder obtained by bisection exhibits a constant-$k$ image impedance at the terminals created by the bisection.

The nature of the invention will be more fully understood from the following detailed description and by reference to the accompanying drawings of which:

Figure 4:
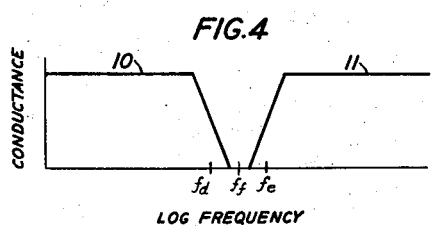
Fig. 4 shows the conductance characteristics of high-pass and low-pass minimum susceptance filters in which the cut-off frequencies are spaced apart.
Figure 6:
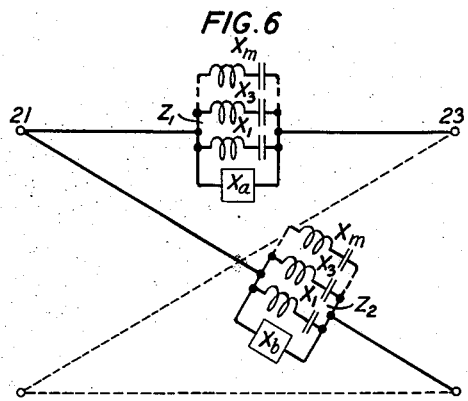
Figure 5:
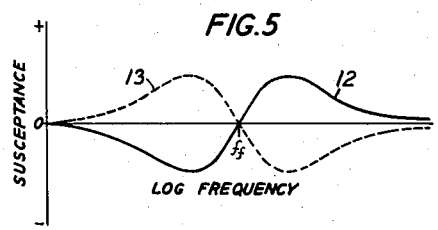
Figure 7:
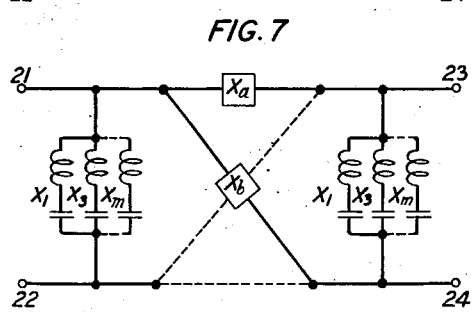
Figure 8:
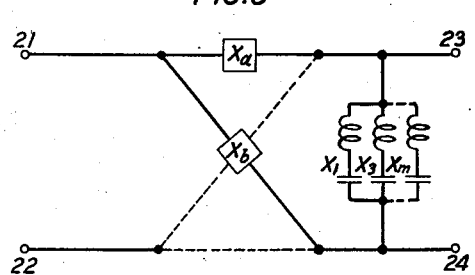
Figure 15:
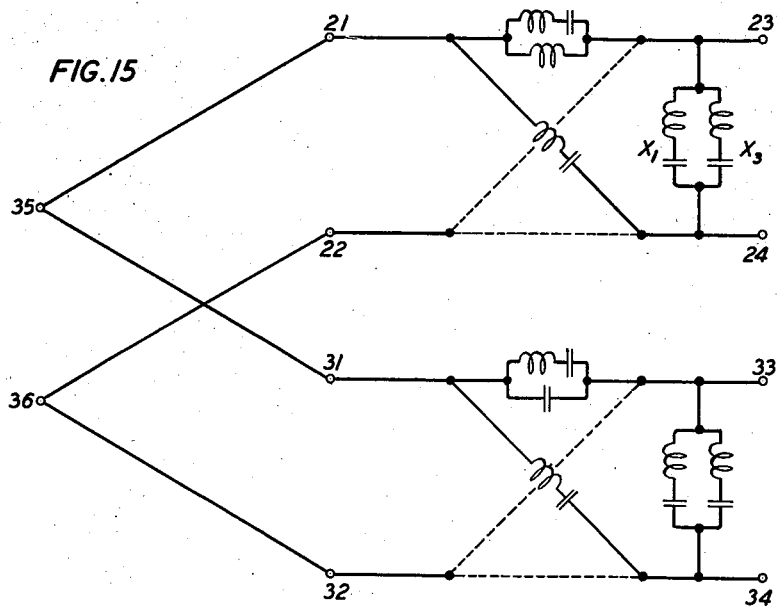
Figure 16:
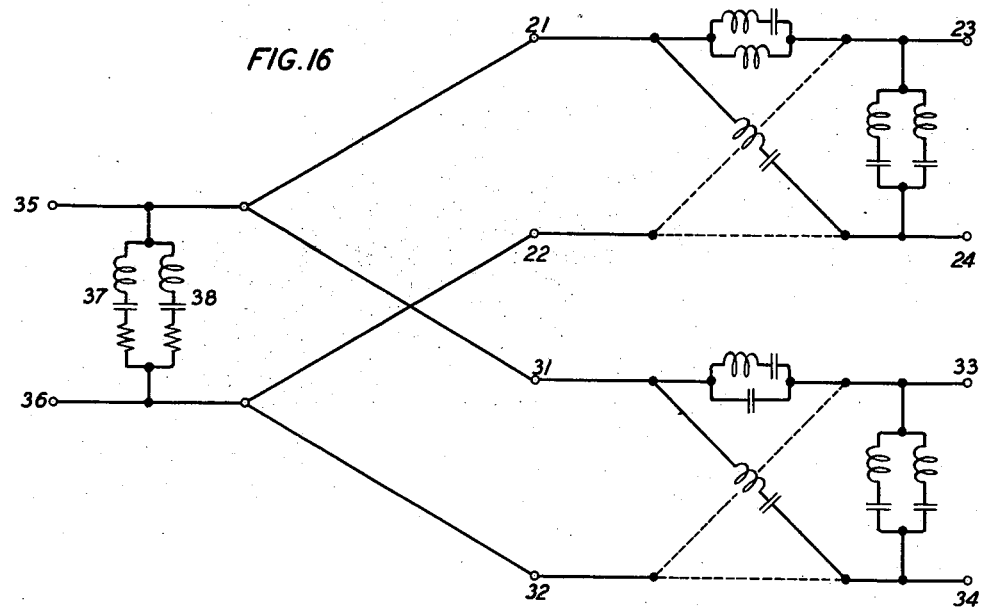
Figure 17:
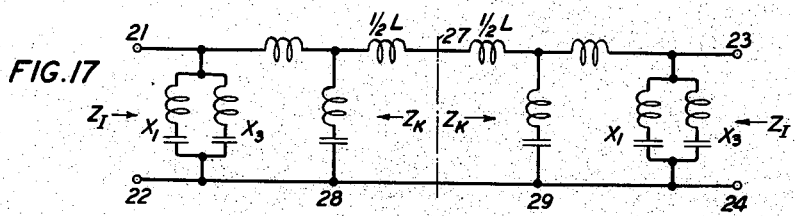
Figure 18:
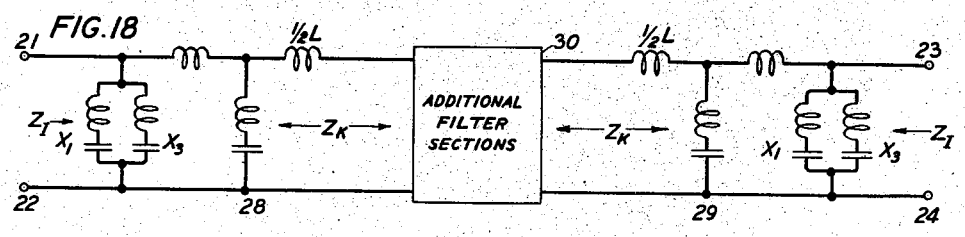
Figure 19:
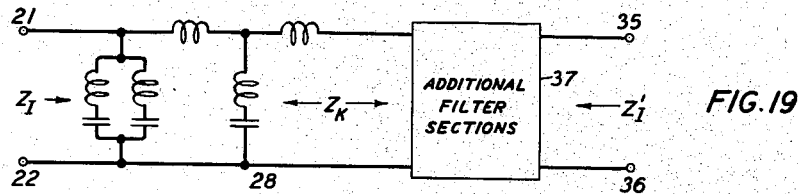
Figure 20:
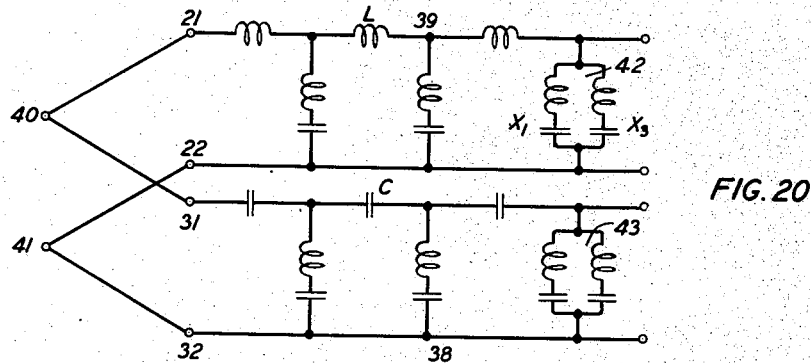
Figure 21:
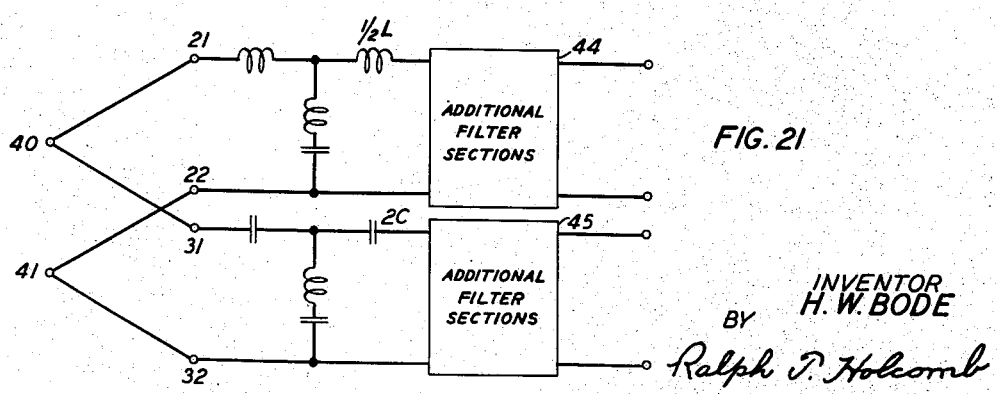
Figure 22:
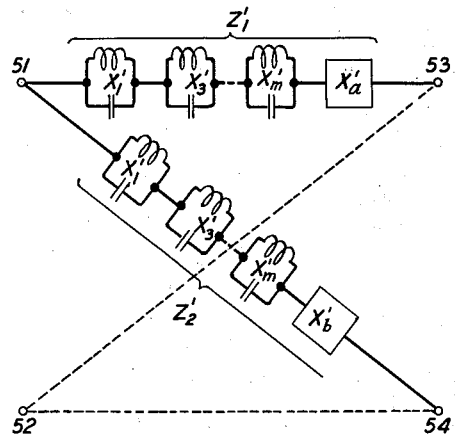
Figure 23:
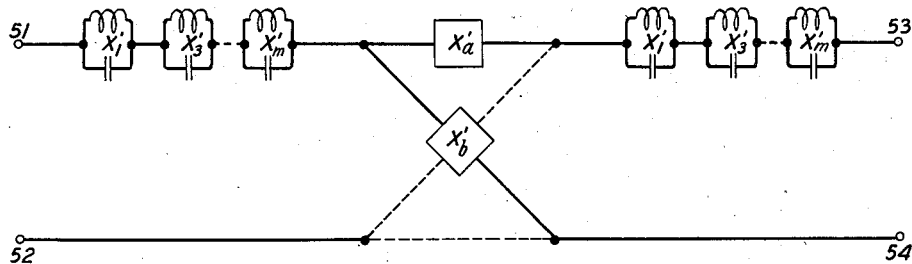
Figure 24:
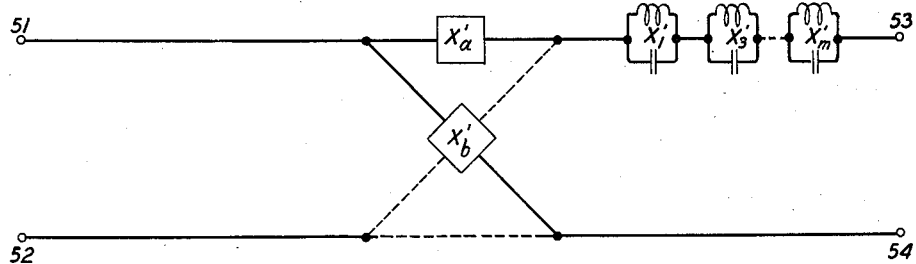
Figure 25:
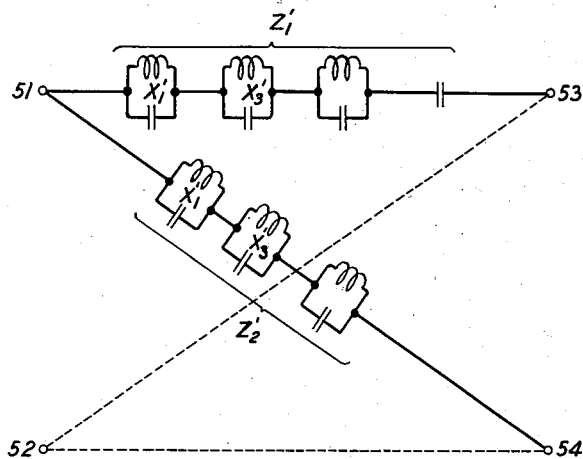
Figure 26:
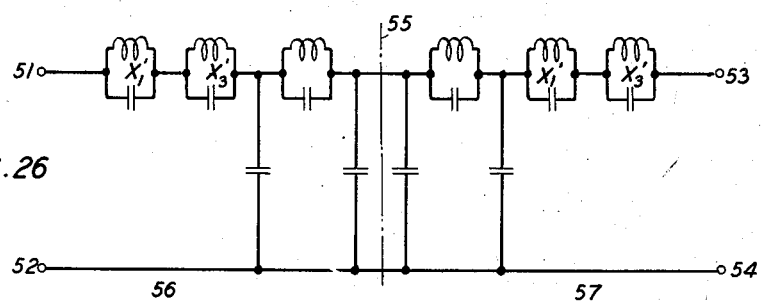
Figure 27:
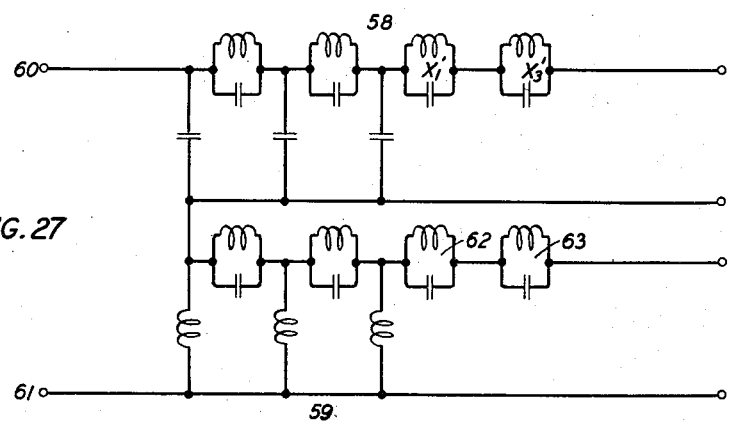

Fig. 5 gives the susceptance characteristic of the filters represented by Fig. 4 and the characteristic of a susceptance correcting branch;

Fig. 6 is a schematic circuit of one form of the prototype lattice filter in accordance with the invention;

Fig. 7 shows a modification of the network of Fig. 6 in which certain common branches are removed from the lattice and placed in shunt at the ends;

Fig. 8 shows the network of Fig. 7 with the shunt branch at the input end removed in order to provide a minimum susceptance network;

Fig. 9 shows a specific embodiment of the invention in a low-pass filter of the lattice type;

Fig. 10 shows the reactance-frequency characteristics of the line and diagonal impedances of the filter of Fig. 9;

Fig. 11 shows the filter of Fig. 9 with the common branches placed in shunt at the ends;

Fig. 12 shows the filter of Fig. 11 with the shunt branch at the input end removed;

Fig. 13 shows a high-pass filter analogous in design to the low-pass filter of Fig. 9;

Fig. 14 shows the filter of Fig. 13 with the common branches connected in shunt at one end only;

Fig. 15 shows the filters of Figs. 12 and 14 connected in parallel at their input ends for group operation;

Fig. 16 shows how the parallel combination of filters of Fig. 15 may be modified by the addition of susceptance-correcting branches when the cut-off frequencies are spaced apart;

Fig. 17 shows the completely developed unbalanced ladder structure equivalent to the lattice of Fig. 9;

Fig. 18 shows the ladder structure of Fig. 17 split at the center into two halves with additional filter sections inserted therebetween;

Fig. 19 shows a half of the ladder network of Fig. 17 with additional filter sections added at the severed end;

Fig. 20 shows the parallel combination of two complementary low-pass and high-pass ladder-type filters derived respectively from the lattice networks of Figs. 9 and 13;

Fig. 21 shows the filters of Fig. 20 with the output halves replaced by filter sections of different types;

Fig. 22 shows another form of the prototype lattice filter in accordance with the invention;

Fig. 23 shows a modification of the network of Fig. 22 in which the common anti-resonant loops are removed from the lattice and connected in series at the ends;

Fig. 24 shows the filter of Fig. 23 with the series loops at the input end removed to provide a minimum reactance network;

Fig. 25 shows a low-pass filter following the prototype network of Fig. 22;

Fig. 26 shows the completely developed ladder structure equivalent to the lattice of Fig. 25; and Fig. 27 shows the series combination of two complementary low-pass and high-pass ladder filters derived from the prototype lattice of Fig. 22.

The typical image impedance expression for a low-pass filter, for example, can be written as $$Z_I = K \frac{\sqrt{1-\frac{\omega^2}{\omega_c^2}}\left(1-\frac{\omega^2}{\omega_2^2}\right)\cdots\left(1-\frac{\omega^2}{\omega_n^2}\right)}{\left(1-\frac{\omega^2}{\omega_1^2}\right)\left(1-\frac{\omega^2}{\omega_3^2}\right)\cdots} \quad (1)$$

where the quantities in parentheses represent impedance controlling factors. By suitable adjustment of the number and arrangements of the constants $\omega_1 \ldots \omega_n$, the impedance may be assigned as high a degree of uniformity in the transmission band as may be desired. Similarly, a typical image impedance expression for a band-pass filter can be written as $$Z_I = \frac{\left(1-\frac{\omega^2}{\omega_a^2}\right)\cdots\left(1-\frac{\omega^2}{\omega_m^2}\right)\left(1-\frac{\omega^2}{\omega_1^2}\right)\cdots\left(1-\frac{\omega^2}{\omega_n^2}\right)}{\left(1-\frac{\omega^2}{\omega_3^2}\right)\sqrt{1-\frac{\omega^2}{\omega_{c_1}^2}}\sqrt{1-\frac{\omega^2}{\omega_{c_2}^2}}\left(1-\frac{\omega^2}{\omega_2^2}\right)\cdots} \quad (2)$$

where the terms including the constants $$\omega_a \ldots \omega_m, \omega_1 \ldots \omega_n$$

are impedance controlling factors.

While the use of image impedance expressions of this form to secure single filters having very nearly constant impedances in the transmission band is well known, the method cannot readily be applied successfully to groups of filters operating in series or parallel, primarily because the disturbing effects of the other filters degrade the impedance which would be secured from one filter alone. For the networks of the present invention, the resistance or conductance characteristic of the network with appropriate termination is the same as that exemplified by the preceding equations but the reactance or susceptance characteristic is fixed at a minimum value, which depends upon the resistance or the conductance. The effect of this change in the reactance or susceptance characteristic is to produce automatic compensation in a group of filters connected in series or parallel so that the impedance which is realized in the transmission band of each filter separately is substantially the same as would be found for a normally designed filter, having the same number of impedance controlling frequencies, operating alone.

The properties of minimum susceptance and minimum reactance characteristics can be most easily understood by referring to the discussion given in my prior United States Patent 2,123,178, issued July 12, 1938. The properties of minimum reactance and minimum susceptance networks are similar to, although they are not identical with, the properties of the minimum phase shift networks described therein. In Equation 1 of that patent the insertion loss or transfer impedance $Z_T$ of a general four-terminal network is represented as a rational function of frequency of the form $$Z_T = K \frac{(p-a_1)(p-a_2)\ldots(p-a_n)}{(p-b_1)(p-b_2)\ldots(p-b_n)} \quad (3)$$

where, as defined in the discussion of this equation, $p$ is the frequency variable $i\omega$, $K$ is a constant and the $a$'s and $b$'s are the zeros and poles of the transfer impedance. As the discussion of this equation indicated, the quantities $b$ representing poles are confined to one-half of the $p$-plane if the network is physical but the $a$'s may be found in either side of the plane.

The disclosure of Patent 2,123,178 showed that, although in the general network the $a$'s may occur in any part of the plane, particular interest is attached to the condition in which they occur in the same half of the plane as the $b$'s. This was described as the minimum phase shift condition and networks satisfying this condition were defined as minimum phase shift networks. It was shown that any network could be represented as a minimum phase shift network in tandem with a number of all-pass phase shifting sections, the all-pass phase shifting sections corresponding to the $a$'s which must be transferred from one side of the $p$-plane to the other in order to reduce the general transfer impedance expression to the minimum phase shift form. It was further shown that, when a transfer impedance satisfies the minimum phase shift condition, certain contour integral relations between the real and imaginary components of the corresponding insertion loss exist such that if either the real or imaginary component is known at all frequencies the other component can be calculated.

The driving-point impedance of a physical network can also be represented as a rational function of frequency by an equation similar to the foregoing. The chief distinction between a driving-point and a transfer impedance arises from the fact that the driving-point impedance of a passive physical network always has both its zeros and poles confined to one-half of the $p$-plane. In other words, a driving-point impedance always satisfies a mathematical condition equivalent to the minimum phase shift condition, which exists for only a restricted class of transfer impedance expressions. The relations between the real and imaginary components of the logarithm of a transfer impedance when it is of the minimum phase shift type can, therefore, be extended also to the real and imaginary components of the logarithm of a driving-point impedance without restriction.

The real and imaginary components of the logarithm, since they correspond respectively to attenuation and phase shift, represent the natural units in terms of which a transfer impedance characteristic may be analyzed. In discussing driving-point impedances, however, it is more convenient to deal with the resistance and reactance components directly rather than with the logarithm of the impedance function. It is therefore desirable to see what further restrictions need be applied in order to permit this extension. In the development of the contour integral relations between attenuation and phase shift which exist for a minimum phase shift network, use was made of a contour integration taken on the path illustrated by Fig. 1 of Patent 2,123,178. The path shown there consisted of a large semi-circle indented at the points $\pm\omega_1$ and $\pm\omega_c$, where $\omega_c$ represented the particular frequency at which we wish to determine the phase characteristic corresponding to the assumed attenuation characteristic and $\omega_1$ represented a frequency chosen for illustrative purposes as a point at which the insertion loss of the network became infinite. The essential mathematical facts used in developing the contour integral relationships were first, that the insertion loss function which was to be investigated was an analytic function of frequency within this contour; second, that the real and imaginary components of the insertion loss, that is to say, the attenuation and phase, were respectively even and odd functions of frequency; and third, that the singularities of the function at the points $\pm\omega_1$ and at infinity were at most logarithmic. The first and second of these conditions are satisfied by a driving-point impedance function as well as by an insertion loss. Since a driving-point impedance may, however, have poles on the real frequency axis or at infinity, the third condition is not satisfied. If we consider an integration with respect to a driving-point impedance, therefore, it is not possible to discard the contributions to the integration secured from the very small semicircles about the points $\pm\omega_1$ or the very large semicircular path in the neighborhood of infinity in the way which was done in analyzing its insertion losses.

In considering the application of the theorems to image impedances it is to be noted that the expressions for these are not rational functions of frequency, but, in their factored form contain irrational factors corresponding to the cut-off frequencies. However, it may be shown that, although these cut-off factors are in some respects similar to the factors corresponding to the poles and zeros, the cut-offs are not true poles or zeros and their contribution to the contour integration is zero. The general relationships of the real and imaginary parts of a driving-point impedance are, therefore, applicable to the particular case of the image impedance.

These considerations give rise to the concept of minimum reactance and minimum susceptance networks. It was shown by Otto Brune in an article appearing in the Journal of Mathematics and Physics for August 1931 that the driving-point impedance or admittance of any physically realizable network must meet certain requirements which he described as "positive real" conditions. It followed from these conditions that the residues at any poles of impedance or admittance on the real frequency axis must be positive real quantities. He was able to show from this that the poles of impedance at real frequencies could always be represented by anti-resonant circuits, where in the special cases in which the pole occurs at zero or infinite frequency the anti-resonant circuit degenerates into a simple capacity or inductance. In a similar fashion, poles of admittance on the real frequency axis could be identified with series-resonant circuits, including as special cases simple capacities and inductances.

As a further consequence of the discussion in Brune's paper, it appears that the remainder of the impedance or admittance function, after the poles of impedance or admittance appearing on the real frequency axis have been represented in this way, is still a physically realizable impedance or admittance. We can, therefore, represent the most general impedance as a combination of a number of anti-resonant networks in series with an impedance having no poles at real frequencies. Correspondingly, any physical admittance function can be represented by a number of resonant circuits in parallel with a network whose admittance has no poles at real frequencies. We will describe the residual networks which thus remain after the purely reactance components corresponding to poles at real frequencies have been extracted as minimum reactance or minimum susceptance structures. They evidently have the same resistance or conductance components as did the original impedance or admittance, since the extraction of a purely reactance network cannot affect these components. However, since there are no more poles of impedance or admittance on the real frequency axis, there remain no further possibilities for decreasing the reactance or susceptance characteristic without at the same time affecting the resistance or conductance.

When the minimum reactance or susceptance condition is assumed, there can be no poles at infinity or at the illustrative points represented by $\pm \omega_1$ in the contour integral path described previously. The last of the three conditions necessary in performing the integration is therefore satisfied also. We can therefore repeat the analysis made in Patent 2,123,178 step by step if we merely replace the real and imaginary components of the insertion loss by the real and imaginary components of the impedance or admittance. For example, Equation 10 of that patent may be rewritten as $$X_y = \frac{\pi}{2}\left(\frac{dR}{du}\right)_0 + \frac{1}{\pi}\int_{-\infty}^{+\infty}\left[\left(\frac{dR}{du}\right) - \left(\frac{dR}{du}\right)_v\right]\log \coth\frac{|u|}{2} du \quad (4)$$

where $X_y$ denotes the reactance at any assigned frequency $f_y$, R is the resistance component of the impedance, assumed to vary with frequency, $u$ denotes the quantity $$\log_e\frac{f}{f_y}$$

and log coth $$\frac{|u|}{2}$$

indicates that the real part of the logarithm is taken. Equation 4 is also valid if we replace reactance by susceptance and resistance by conductance.

The relation just set forth is in a form suited to the study of combinations of filters in series or parallel. Let it be supposed, for example, that we wish to design a pair of low-pass and high-pass filters to give a nearly uniform constant resistance in both transmission paths. If the low-pass filter is designed in the ordinary way its conductance characteristic plotted against the logarithm of the frequency will approximate curve 1 of Fig. 1, in which $f_c$ represents the cut-off frequency. Its susceptance characteristic cannot ordinarily be computed from Equation 4 relating to real and imaginary components of the admittance because customary filter networks are not of the minimum susceptance type. Following methods described hereinafter, however, it is possible to design a filter to give the prescribed conductance characteristic while at the same time the configuration is restricted to be a minimum susceptance network. The resulting susceptance characteristic can then be computed by Equation 4 and has the general form indicated by curve 2 of Fig. 2. If we suppose that the cut-off of the high-pass filter coincides with that of the low-pass filter, its conductance characteristic can similarly be represented by curve 3 of Fig. 1 and, if the high-pass filter is also restricted to a minimum susceptance configuration, the corresponding susceptance is of the general form shown by curve 4 of Fig. 2.

Figure 1:
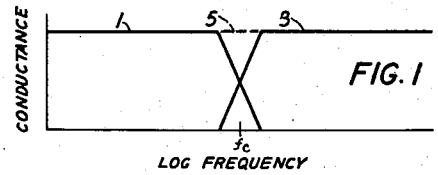
Fig. 1 shows the conductance characteristics og high-pass and low-pass minimum susceptance wave filters in accordance with the invention.
Figure 2:
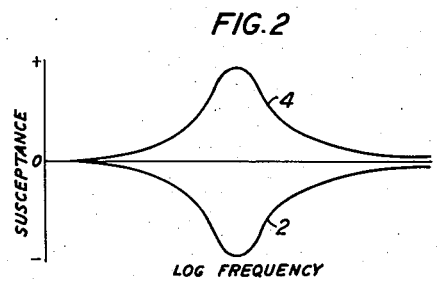
Fig. 2 shows the form of the susceptance characteristics of the filters.

It should be noted that the conductance characteristics illustrated in Fig. 1 are of a highly idealized type which cannot be realized but which may be closely approximated by wave filter image impedances or admittances. The actual conductance characteristics would exhibit small undulations about the straight line and corresponding undulations would appear in the susceptance characteristic. The general courses would, however, be much as shown.

When the two filters are combined in parallel, the total admittance of the system will be the sum of the admittances to the filters separately. Since the cut-offs coincide, the sum of the two conductances will be substantially constant at all real frequencies as shown by the dotted line 5 of Fig. 1, which coincides with the horizontal portions of curves 1 and 3. The sum of the susceptance characteristics becomes very small at all real frequencies. If the two filters are each of the minimum susceptance type, the sum of the admittances must also be a minimum susceptance function. As the resulting conductance characteristic approaches constancy at all real frequencies, we can see immediately from Equation 4 relating susceptance to conductance that the susceptance must tend towards zero. It is not necessary to calculate the two susceptance characteristics separately. On the other hand, if minimum susceptance configurations are not chosen for the two filters, a residual susceptance characteristic must remain after they are combined in parallel. Since this susceptance characteristic must, by Brune's analysis, correspond to the characteristic of some combination of positive reactance elements, it cannot be annulled by subsequent addition of any further positive physical reactances in parallel. The residual susceptance remains to degrade the transmission and impedance characteristics of the circuit.

Figure 3:
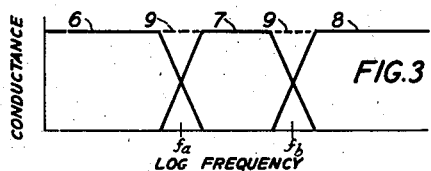
Fig. 3 shows the conductance characteristics for low-pass, band-pass and high-pass minimum susceptance filters.

This result can evidently be extended to a combination of any number of filters in parallel. If the individual filters are restricted to minimum susceptance configurations and if the total conductance is substantially constant, the total susceptance will be substantially zero. An example showing a combination of low-pass, high-pass and band-pass filters with cut-offs at $f_a$ and $f_b$ is shown in Fig. 3. Curves 6, 7 and 8 represent the conductance characteristics of the low-pass, band-pass and high-pass filters, respectively, and the dotted line 9 is the total conductance.

In many engineering applications involving filters which must operate in parallel it is found convenient to separate the transmission bands of the two filters somewhat since this allows the attenuation requirements on the filters to be made less severe. When filters are designed in this fashion their total conductance characteristic is nearly constant in both transmission bands but falls to a low value in the intermediate region. The characteristics shown by curves 10 and 11 of Fig. 4, for example, illustrate the conductance characteristics which might be secured, respectively, from a low-pass filter and a high-pass filter whose transmission bands are slightly separated. The cut-off frequencies occur at $f_d$ and $f_e$, respectively. If both filters are of the minimum susceptance configuration, the resulting susceptance can be computed by means of Equation 4 and appears in the form shown by curve 12 of Fig. 5. Although the susceptance characteristic of the combination is no longer zero, it is of a type which can readily be canceled by the addition of a supplementary network. Dotted line curve 13 of Fig. 5, for example, represents the susceptance which would be furnished by the addition of a suitably chosen damped resonant circuit resonating at the geometric mean at the two filter cut-offs $f_r$. It will be seen that by the addition of a simple supplementary branch of this type the net susceptance of the two filters connected for joint operation is substantially zero within the transmission ranges of both filters. If required, more perfect cancellation of the residual susceptance can, of course, be obtained by resorting to a more elaborate correcting branch, for example one comprising two or more resonant circuits whose resonance frequencies differ slightly and are suitably chosen with respect to the impedance controlling frequencies in the original filters.

Particular embodiments of the invention will now be considered. In Fig. 6 is shown schematically one form of the symmetrical prototype filter of the invention. It comprises a symmetrical lattice having two similar line impedances $Z_1$ and two similar diagonal impedances $Z_2$ connected between input terminals 21, 22, and output terminals 23, 24. Only one line branch and one lattice branch are shown in detail for the sake of clarity, the other branches being indicated by dotted lines. Each impedance is made up of a plurality of resonant branches connected in parallel and designated $X_1, X_3 \ldots X_m$ together with other impedances indicated by $X_a$ and $X_b$, the exact character of which may for the present be left unrestricted.

The branches $X_1$ to $X_m$ are identical in the two impedances and all are resonant at frequencies in the attenuation range. The impedances $X_a$ and $X_b$ may likewise comprise groups of resonant branches in parallel, but other equivalent forms may be used if desired. All of the critical frequencies of these impedances lie within the transmission band or at the cut-off. With respect to the two groups of branches in each impedance, the branches $X_1$ to $X_m$ represent the elements which mainly determine the image impedance and the impedances $X_a$ and $X_b$ determine the image transfer constant.

The characterizing feature of the prototype symmetrical filter is that it has an attenuation peak at each pole and each zero of its image impedance. This permits its realization in the form shown in Fig. 6 with identical branches in the impedances $Z_1$ and $Z_2$ and also permits the determination of the portions $X_a$ and $X_b$. The general design procedure is as follows, the case of a low-pass filter being assumed.

The expression for the image impedance $Z_I$ may be written in the form $$Z_I = \frac{H a_1 a_3 \ldots a_m}{\sqrt{a_0 a_2 a_4 \ldots a_{m-1}}} \quad (5)$$

in which $H$ is a magnitude factor and the terms $a_j$ symbolize critical frequency factors of the form $$1 - \frac{f^2}{f^2_j}$$

the number of factors and the values of the critical frequencies $f_j$ are chosen to provide the desired degree of uniformity of the image impedance in the transmission band. The values of the critical frequencies may, for example, be chosen in accordance with the principles disclosed in the aforementioned Cauer patent. Evidently the critical frequencies $f_1, f_3 \ldots f_m$ which determine the impedance zeros will correspond to the resonances of the branches $X_1$ to $X_m$ and, for convenience, it may be assumed that they correspond respectively.

The requirement that the filter exhibit an attenuation peak at each of the poles and zeros of the image impedance serves to specify the simple roots at real frequencies of the equation $$\tanh \frac{\theta}{2} = 1 \quad (6)$$

where $\theta$ denotes the image transfer constant. This, together with the cut-off frequency, permits the development of the complete expression for $$\tanh \frac{\theta}{2}$$

as a function of frequency. From the expressions for the image impedance and the image transfer constant the values of the impedances $Z_1$ and $Z_2$ are at once obtained in a well-known manner. The impedances $Z_1$ and $Z_2$ obtained in this way will be of the minimum complexity corresponding to the assigned real frequency roots of $$\tanh \frac{\theta}{2} = 1$$

The introduction of additional roots and particularly roots at imaginary or complex frequencies is avoided. When the two impedances so determined are developed in the form of parallel connected resonant branches, identical branches will appear in each as indicated in Fig. 6. The reason for this is easily seen. It is evident that each impedance must include branches respectively resonant at the zero frequencies $f_1, f_3 \ldots f_m$. The branches $X_1$ to $X_m$ in the two impedances must therefore have corresponding resonance frequencies. At frequencies very close to each of these resonances the impedances $Z_1$ and $Z_2$ become simply the impedances of the corresponding resonant branches and at each resonance the frequency derivative of the impedance is equal to twice that of the inductance in the resonant branch. The presence of an attenuation peak at each resonance requires the equality of $Z_1$ and $Z_2$ at these points. Since both $Z_1$ and $Z_2$ become zero at the resonances, the condition of equality requires that both should approach zero at the same rate or, in other words, that their frequency derivatives should be equal. The inductances of corresponding resonant branches must therefore be equal and, hence, also the capacities.

It may be observed that in the case discussed above the presence of attenuation peaks at the zeros only of the image impedance is sufficient to insure the identity of the branches resonating in the attenuation range. In the general prototype filter of the invention it is preferable, for reasons that will appear hereinafter, to have attenuation peaks at each pole and each zero of the image impedance but the modified form with the smaller number of peaks is itself useful in many applications. The number of attenuation peaks determines the complexity of the reactances $X_a$ and $X_b$, the simplest rule for determining their character and configuration being that the number of pole-zero intervals created by $Z_1$ and $Z_2$ in the transmission band is equal to the number of the attenuation peaks. This may also be expressed by the statement that the number of pole-zero intervals of $$\tanh \frac{\theta}{2}$$

in the transmission band is equal to the number of attenuation peaks. When the attenuation peaks are present only at the image impedance zeros the reactances $X_a$ and $X_b$ will contain fewer elements than when peaks are present at all of the critical frequencies.

Since the prototype filter is symmetrical and since all of the roots of $$\tanh \frac{\theta}{2}=1$$

are at real frequencies, it follows from the principles discussed in my paper on A General Theory of Electric Wave Filters, Journal of Mathematics and Physics, vol. XIII, November 1934, that the lattice form may be transformed to an equivalent series-shunt configuration which is also symmetrical. The first step in the transformation is to remove the identical branches $X_1$ to $X_m$ from the lattice arms and to place them in shunt across the input and output terminals as shown in Fig. 7. The diminished lattice now contains only the reactances $X_a$ and $X_b$. The equivalence of the networks of Figs. 6 and 7 is well known but reference may be made to the above-noted article for a discussion of the underlying theorems. Further applications of these theorems, taking outside of the lattice common series and common shunt portions of the branches alternately, completes the transformation to the ladder-type equivalent network.

The symmetry of the ladder network permits its bisection and each resulting half constitutes an unsymmetrical filter having one-half the transfer constant of the prototype but with the same number of attenuation peaks. The two image impedances of each half filter are different from each other in respect of the number of poles and zeros. In my above-mentioned article it is shown that the difference in the number of zeros and poles of the two image impedances of an unsymmetrical filter is equal to the number of simple roots at real frequencies of the equation $\tanh \theta = 1$, where $\theta$ is the transfer constant of the complete unsymmetrical filter. Applying this rule to the two filters obtained by the bisection of the prototype, it follows that when the prototype has an attenuation peak at each pole and zero of its image impedance, the image impedance of each half at the bisection point can have no pole or zero and must, therefore, be of the constant-$k$ type. In the case of the modified prototype having attenuation peaks at the image impedance zeros only, the image impedances of the half filters at the bisection point will be more complex.

The prototype filters of the invention shown in the foregoing have a configuration which permits the segregation into end branches of the impedance elements that produce the poles and zeros of the image impedance. In the modified form shown in Fig. 7 these impedance controlling elements are brought out and appear in terminal shunt branches. If the filter of Fig. 7 be terminated in its own image impedance at terminals 23, 24, and the shunt branch at its input terminals be then removed, the conductance component of the driving-point admittance at terminals 21, 22 will not be changed, but the poles and zeros of the susceptance will be eliminated. The network so obtained is shown in Fig. 8 and is a minimum susceptance network in accordance with the invention.

In order to present a concrete example it will be assumed that the low-pass filter of Fig. 6 has two zeros and one pole in its image impedance. Each impedance $Z_1$ of the prototype lattice will have two parallel branches $X_1$ and $X_3$ which will have their counterparts in the other impedance $Z_2$. If there are to be attenuation peaks at the image impedance zeros only, the minimum number of elements for the impedances $X_a$ and $X_b$ will be one for the one and two for the other. If an attenuation peak is to be added at the image impedance pole, the number of elements in the one impedance must be increased to three. The circuit of the resulting filter, for the latter condition, is shown in Fig. 9. The reactance-frequency characteristics of the $Z_1$ and $Z_2$ impedances are shown symbolically in Fig. 10 by the solid-line curve 27 and the dotted-line curve 28, respectively. The cut-off frequency is $f_0$ and it will be noted that at the frequencies $f_1$, $f_2$ and $f_3$ the two curves are tangent. The branches $X_1$ and $X_3$ of Fig. 9 may be removed and placed at the ends as shown in Fig. 11. If the shunt combination 19 of Fig. 11 is removed, as shown in Fig. 12, the resulting filter will be of the minimum susceptance type. The circuit for the complementary high-pass filter analogous to the low-pass filter of Fig. 9 is given in Fig. 13, and that of the resulting minimum susceptance high-pass filter in Fig. 14.

The minimum susceptance low-pass and high-pass filters of Figs. 12 and 14 are well adapted for operation in parallel at their input ends, as shown in Fig. 15. Assuming that both filters are terminated at their output terminals 23, 24 and 33, 34 in substantially matching impedances, the conductance component of the input admittance of the combination at terminals 35, 36 will be substantially constant, and the susceptance will be substantially zero over the entire frequency range. There may be slight irregularities in the conductance in the neighborhood of the common cut-off $f_0$ and there may be small susceptance components in this region. However, the magnitudes of these irregularities may be reduced to any desired extent by adding additional impedance controlling factors and the corresponding extra reactance elements to one or both filter circuits.

The two complementary filters will ordinarily have the same cut-off frequency. However, as already pointed out, it may be found advantageous to space the two cut-offs apart by a small percentage of frequency. If this is done the input susceptance of the combination can, in general, be made more nearly zero by shunting across the input terminals 35, 36 one or more susceptance-correcting branches, such as 37 and 38 as shown in Fig. 16. Each branch consists of an inductance, a capacitance and a resistance connected in series, the values of which will depend upon the requirements of the particular case.

In accordance with the invention, the lattice network of the type shown in Figs. 9 and 11 may be further developed into a ladder-type structure, in the manner already explained. The ladder structure has the advantages that it can be built in the unbalanced form so that one side may be grounded and that the network may be bisected so that one-half may be used as a terminating structure in a composite network. Furthermore, for the example given and for all more complex structures in accordance with the invention, the ladder form requires appreciably fewer component elements for a given transmission characteristic than any other known filter structure. The completely developed ladder structure will be as shown in Fig. 17 and may be bisected at the central series inductance L, as shown by the line 27, into two equal halves 28 and 29. Since in this illustration the lattice prototype has a peak of attenuation at each zero and each pole of the image impedance, each half of the bisected ladder structure will have at one end an image impedance $Z_I$ corresponding to the image impedance of the original lattice, and at the point of bisection an image impedance $Z_k$ of the constant-$k$ type, as indicated by the arrows.

An additional section or sections having matching terminal image impedances $Z_k$ may be inserted in the middle of the divided network as indicated by the block 30 in the composite structure of Fig. 18 in order to add attenuation to the filter. Each half may also be used as a terminating network in a composite structure as shown in Fig. 19. The block 37 represents one or more half-sections connected in tandem with the half 28. The added portion should, of course, have an image impedance at one end which will match the image impedance $Z_k$ at the point of juncture, but at the other end the image impedance may be of any desired type $Z_{I'}$. The composite structure will then have image impedances $Z_I$ and $Z_{I'}$ at its ends which may or may not be equal, and by means of the additional sections 37 the attenuation may be built up as required. The added portions 30 and 37 may be of the ladder, lattice, bridged-T or any other suitable type.

The high-pass filter of Fig. 13 may, of course, also be developed into a ladder structure. Fig. 20 shows the resulting structure 38 connected in parallel at one end with a complementary low-pass filter 39 of the type shown in Fig. 17. It will be noted that, in accordance with the invention, the initial shunt branches at the paralleled ends, corresponding to the branches 42 and 43 at the output ends, have been deleted in order to eliminate the susceptance component of the input admittance at the terminals 40 and 41. The combination will have the same transmission and impedance characteristics as the system shown in Fig. 15.

The halves at the output ends of the filters of Fig. 20 may be replaced by sections of other types, as indicated by the blocks 44 and 45 in Fig. 21. Each additional portion should have an image impedance of the constant-$k$ type at the junction point so that it will substantially match the impedance of the filter to which it is connected. At the output end each filter should have an impedance which will substantially match the impedance of the terminal load connected thereto, which is usually a constant resistance.

Fig. 22 shows schematically another form of the prototype filter of the invention, the one which is preferred for series connection with other filters. The filter is a symmetrical lattice comprising a pair of equal line impedances $Z_1'$ and a pair of equal diagonal impedances $Z_2'$ connected between input terminals 51, 52 and output terminals 53, 54. The configuration of the impedances is inverse with respect to those in the prototype lattice of Fig. 6, each consisting of a plurality of series connected anti-resonant loops $X_1', X_3' \ldots X_m'$ in series with a general impedance which is designated $X_a'$ in $Z_1'$ and $X_b'$ in $Z_2'$. The impedances $Z_1', Z_2'$ in Fig. 22 have poles and zeros of impedance which correspond to poles and zeros of admittance in the impedances $Z_1, Z_2$ of Fig. 6, and the loops $X_1'$ to $X_m'$ are anti-resonant at the frequencies at which the branches $X_1$ to $X_m$ are resonant. The loops $X_1'$ to $X_m'$ are identical in the two impedances $Z_1', Z_2'$ and all are anti-resonant in the attenuation range of the filter. All of the critical frequencies of the impedances $X_a'$ and $X_b'$ lie within the transmission band or at the cut-off. As in the filter of Fig. 6, the loops $X_1'$ to $X_m'$ represent the elements which mainly determine the image impedance and the impedances $X_a'$ and $X_b'$ determine the image transfer constant. Also, as in Fig. 6, the filter preferably has an attenuation peak at each pole and each zero of its image impedance. The two filters will have the same transfer constant but inverse image impedances.

By analogy with the procedure discussed above in connection with Fig. 7, the identical loops $X_1'$ to $X_m'$ may be removed from the lattice arms and placed in series at each end of the reduced structure as shown in Fig. 23. Now if the filter of Fig. 23 be terminated in its own image impedance at terminals 53, 54 and the series loops $X_1'$ to $X_m'$ at its input end be then removed, the resistance component of the driving-point impedance at terminals 51, 52 will not be changed, but the poles and zeros of the reactance will be eliminated. Fig. 24 shows the resulting network, which is a minimum reactance network in accordance with the invention.

Following the prototype lattice of Fig. 22 the low-pass filter of Fig. 9 will have the configuration shown in Fig. 25. The completely developed ladder structure, corresponding to Fig. 17, is shown in Fig. 26. In this case it is necessary to interchange the $Z_1'$ and the $Z_2'$ impedances before proceeding with the ladder development. This changes the phase characteristic but not the attenuation of the filter. The network may be bisected at the central shunt condenser, as indicated by the line 55, into the two equal halves 56, 57 which may be used in the same way as the halves 28, 29 in Figs. 18 and 19.

Fig. 27 shows a low-pass filter 58 of the type shown in Fig. 26 connected at one end in series with the analogous complementary high-pass filter 59. In accordance with the invention the series anti-resonant loops at the series connected ends of the filters, corresponding to the loops $X_1'$, $X_3'$, 62 and 63 at the output ends, have been removed in order to eliminate the reactance component of the driving-point impedance at the terminals 60 and 61, and thus provide a substantially constant non-reactive input impedance.

What is claimed is:

1. A wave filter in which an image impedance or an image admittance has a plurality of poles and zeros at real frequencies and the image transfer constant has a pole coincident with each pole of the image impedance or each pole of the image admittance.

2. A wave filter in which an image impedance or an image admittance has a plurality of poles and zeros at real frequencies and the image transfer constant has a pole coincident with each pole and each zero of the image impedance or the image admittance.

3. A wave filter in accordance with claim 1 in which the poles and zeros of the image impedance or the image admittance are so distributed as to make the real part of the function substantially constant throughout substantially the entire transmission band.

4. A wave filter in accordance with claim 2 in which the poles and zeros of the image impedance or the image admittance are so distributed as to make the real part of the function substantially constant throughout substantially the entire transmission band.

5. A wave filter in accordance with claim 1 the prototype lattice equivalent of which is characterized by the inclusion in each line branch and each diagonal branch of identical impedances representing the image impedance poles or the image admittance poles.

6. A wave filter in accordance with claim 2 the prototype lattice equivalent of which is characterized by the inclusion in each line branch and each diagonal branch of identical impedances representing the image impedance poles or the image admittance poles.

7. An unsymmetrical wave filter of the ladder type having at one end an image impedance or an image admittance characterized by a plurality of poles and zeros at real frequencies and at the other end an image impedance or an image admittance of the constant-$k$ type, the image transfer constant of said filter having a pole coincident with each pole and each zero of the image impedance or the image admittance at said one end.

8. A minimum reactance or minimum susceptance wave filter which, when terminated at one end in a substantially matching impedance, has at its other end an input resistance or an input conductance corresponding to the real part of an image impedance function or an image admittance function having a plurality of poles and zeros at real frequencies, and at said other end has an input reactance or an input susceptance of minimum value relative to said resistance or conductance.

9. In combination, a wave filter in accordance with claim 8 and a two-terminal network of pure reactances by means of which the input impedance is made a pure resistance in the transmission band of the filter.

10. In combination, a plurality of minimum reactance filters in accordance with claim 8 connected in series, the sum of the reactances of said filters being substantially zero at all frequencies and the sum of their resistances being substantially constant at all frequencies.

11. In combination, a plurality of minimum susceptance filters in accordance with claim 8 connected in parallel, the sum of the susceptances of said filters being substantially zero at all frequencies and the sum of their conductances being substantially constant at all frequencies.

12. In combination, a plurality of filters of the minimum susceptance type in accordance with claim 8 and a susceptance-correcting branch, said filters having mutually exclusive transmission bands, the cut-off frequencies of two adjacent transmission bands being spaced apart, said filters being connected in parallel at one end to a common pair of terminals, and said susceptance-correcting branch being connected between said terminals.

13. In combination, a low-pass filter and a high-pass filter of the minimum susceptance type in accordance with claim 8 and a susceptance-correcting branch, the cut-off frequencies of said filters being spaced apart, said filters being connected in parallel at one end to a common pair of terminals, and said susceptance-correcting branch being connected between said terminals.

14. A minimum reactance wave filter of the ladder type which, when terminated at one end in an impedance having the value and frequency variation corresponding to a constant-$k$ image impedance for a pair of assigned band limits, has at its other end an input impedance the resistance of which corresponds to said terminating impedance modified by a plurality of critical frequency factors and the reactance of which is the minimum corresponding to said resistance.

15. In combination, a wave filter in accordance with claim 14 and a two-terminal network of pure reactances connected in series with said filter at said other end by means of which the input impedance of said combination at said other end is made a pure resistance in the transmission band of the filter.

16. A wave filter in accordance with claim 14 and means including an additional filter half-section for providing substantially the desired constant-$k$ terminating impedance.

17. A minimum susceptance wave filter of the ladder type which, when terminated at one end in an admittance having the value and frequency variation corresponding to a constant-$k$ image admittance for a pair of assigned band limits, has at its other end an input admittance the conductance of which corresponds to said terminating admittance modified by a plurality of critical frequency factors and the susceptance of which is the minimum corresponding to said conductance.

18. In combination, a wave filter in accordance with claim 17 and a two-terminal network of pure reactances connected in shunt with said filter at said other end by means of which the input admittance of said combination at said other end is made a pure conductance in the transmission band of the filter.

19. A wave filter in accordance with claim 17 and means including an additional filter half-section for providing substantially the desired constant-$k$ terminating admittance.

HENDRIK W. BODE.